United States Patent
Kunz

(10) Patent No.: US 10,816,664 B2
(45) Date of Patent: Oct. 27, 2020

(54) OBSERVATION DEVICE HAVING AN EYE-CONTROLLED LASER RANGEFINDER

(71) Applicant: Safran Vectronix AG, Herbrugg (CH)

(72) Inventor: Daniel Kunz, Widnau (CH)

(73) Assignee: SAFRAN VECTRONIX AG, Heerbrugg (CH)

( * ) Notice: Subject to any disclaimer, the term of this patent is extended or adjusted under 35 U.S.C. 154(b) by 409 days.

(21) Appl. No.: 15/832,068

(22) Filed: Dec. 5, 2017

(65) Prior Publication Data

US 2018/0180734 A1 Jun. 28, 2018

(30) Foreign Application Priority Data

Dec. 22, 2016 (EP) .................... 16206369

(51) Int. Cl.
*G01S 17/08* (2006.01)
*G01S 7/497* (2006.01)
(Continued)

(52) U.S. Cl.
CPC .......... *G01S 17/08* (2013.01); *G01C 3/08* (2013.01); *G01S 7/48* (2013.01); *G01S 7/4804* (2013.01); *G01S 7/4812* (2013.01); *G01S 7/4814* (2013.01); *G01S 7/497* (2013.01); *G01S 7/4972* (2013.01); *G01S 17/88* (2013.01); *G02B 27/0093* (2013.01); *G02B 27/64* (2013.01); *G06F 3/013* (2013.01)

(58) Field of Classification Search
None
See application file for complete search history.

(56) References Cited

U.S. PATENT DOCUMENTS

2012/0133917 A1 5/2012 Tiefenthaler
2014/0226002 A1 8/2014 Metzler et al.
(Continued)

FOREIGN PATENT DOCUMENTS

DE 102010039255 A1 2/2012
EP 1840627 B1 * 12/2012 ............. G06F 3/013
(Continued)

OTHER PUBLICATIONS

European Search Report and Written Opinion EP 16206369 (dated Jun. 1, 2017).

*Primary Examiner* — Isam A Alsomiri
*Assistant Examiner* — Amir J Askarian
(74) *Attorney, Agent, or Firm* — David A. Jones; Alpine IP PLLC

(57) ABSTRACT

The invention pertains to a hand-held observation device and methods for observing distant targets, comprising at least a first optical observation channel defining a first observation optical axis by receiving and imaging optical light rays onto an image plane for observations of a user, a first eyepiece being arranged at the first optical observation channel, and a laser range finder for determining, along an axis of the laser range finder, a distance between the observation device and a target, wherein at least one light source is adapted to emit light to illuminate a user's eye at the first eyepiece, an image sensor that is adapted to capture images of the eye, and comprises an electronic image processing unit for determining, in real-time, eye parameters that indicate a gazing direction of the user.

24 Claims, 4 Drawing Sheets

(51) Int. Cl.
   *G01S 7/481*   (2006.01)
   *G01S 7/48*   (2006.01)
   *G06F 3/01*   (2006.01)
   *G02B 27/64*   (2006.01)
   *G02B 27/00*   (2006.01)
   *G01C 3/08*   (2006.01)
   *G01S 17/88*   (2006.01)

(56) References Cited

U.S. PATENT DOCUMENTS

2017/0211932 A1   7/2017   Zadravec et al.
   2019/0257648 A1*   8/2019   Lancaster ............... H04W 4/80

FOREIGN PATENT DOCUMENTS

EP   2551636 A1 *   1/2013   ............... G01C 1/04
   EP   2551636 A1   10/2013

* cited by examiner

OBSERVATION DEVICE HAVING AN EYE-CONTROLLED LASER RANGEFINDER

TECHNICAL FIELD

The invention relates to an observation device comprising a laser rangefinder, wherein the laser rangefinder is controllable by the eye of a user of the observation device. In particular, said eye-control of the rangefinder also pertains to controlling an opto-mechanical stabilization unit of the device for actively and equally stabilizing both transmitter and receiver channels of the integrated laser rangefinder.

BACKGROUND

Generic observation devices have diverse fields of application, for example in hunting, for landmark navigation on land or at sea, for aiming at objects, for acquiring and documenting geographic surroundings, as information device for hikers, etc. In addition to such civilian fields of application, such devices are also used in the military area for navigation, observation, etc. It is important for the device to be robust, convenient, operable in a quick and simple manner, and as compact and as light as possible as well as to have comparatively low power consumption.

The observation devices within the scope of the present invention are robust devices designed for use in the field. These devices are not highly precise and correspondingly sensitive as geodetic surveying devices such as tachymeters or theodolites with measurement resolutions in the millimeter range or with higher measurement resolutions, which are used e. g. in the construction sector. The devices described here usually have measurement resolutions of the order of meters or, at best, decimeters, but have measurement ranges of several kilometers, for example of up to five, ten or twenty kilometers or even more. The observation devices are primarily designed for hand-held use by persons, i.e., for example, as field glasses or binoculars, monocular telescopes, spotting scopes, etc., but can be attached to a tripod or the like if necessary as well.

The observation devices treated here can particularly comprise an optically transmissive light channel, i.e. being conventional optical devices in terms of the basic function thereof, in which optical radiation is directed directly from the observed target object into the eye of the observer. However, in other embodiments, these can also be observation devices in which an observation image is recorded using a camera, the image is converted into electrical signals and the electrical signals are reproduced for the observer on a screen display. Here, especially in the case of the devices with a screen, the observation through an eyepiece, through which the recorded observation image can be observed, can be brought about in the conventional manner. Here, the observation path can by all means comprise optical elements for beam shaping, beam deflection, mirroring information in and out, amplifying residual light, etc. Specifically, this can relate to hand-held observation devices or distance-measuring observation devices which are generically embodied for use as a hand-held device, for example by appropriate handles, shaping, etc.

Typically, the optical targeting enabled by the observation device also determines the direction of the distance measurement. The point to be measured is targeted by means of an optical means of the transmissive light channel, for example by means of crosshairs in the observation channel of the device. In the case of electro-optical distance meters or rangefinders (LRF), an optical signal, for example as optical radiation in the form of laser light pulses, is emitted by the device in the direction of the target object, the distance of which is intended to be determined. If visible light is used in the process, the point on the target object targeted for measuring purposes can be identified visually in the case of appropriate light conditions. However, non-visible wavelengths, e.g. in the infrared spectral range, are often used and the point on the target object targeted for measuring purposes is determined for the user purely by targeting with the observation channel of the device.

The surface of the target object reflects at least a portion of the emitted optical signal, usually in the form of a diffuse reflection. In the device, the reflected optical radiation is converted into an electrical reception signal by a photosensitive detector element. The distance between the device and the target object can be determined with knowledge of the propagation speed of the optical signal and on the basis of the determined travel time between emission and reception of the signal (i.e. the travel time which light requires for covering the distance from the device to the target object and back again). There usually are one or more optical components for beam shaping, deflection, filtering, etc. such as lens elements, wavelength filters, mirrors, etc. in the optical transmission or reception path. Transmission and reception can be brought about coaxially using a single optical unit or separately using two separated optical units (e.g. arranged next to each other). Here, the distance meter or the rangefinder is integrated in the observation device.

The measurement requires sufficiently strong signal intensities, which can be detected by the receiver, of the returning reception signal. However, the signal power that can be emitted from the optoelectronic LRF considered here is restricted by physical and regulatory limits. Therefore, work is often undertaken with pulsed operation. Thus, the intensity amplitude of the emitted optical signal is modulated in a pulse-like manner. Temporally short pulses with a high peak power are emitted, followed by pauses during which no light is emitted. Hence, the cast-back component of the pulses has a sufficiently high intensity to allow these to be evaluated in the presence of background disturbances and noise, in particular even in the presence of background light (sunlight, artificial illumination, etc.).

In the case of observation devices with rangefinders, ranges from several meters up to many kilometers, for example from 5 m to 20 or 30 km, are required in this case, and this is required with a measurement accuracy of several meters or even higher measurement accuracy, for example of ±5 m or ±1 m or less. Since, in general, the measurement target does not have special reflective target markers for the measurement (as is conventional in measurement rods, measurement prisms etc. used in surveying), the applied optical distance measurement signal must be embodied and set in the device design in such a way that a distance measurement is possible over the whole specified measurement range (or the range must be specified on the basis of the possibilities of the used signal). Since only a small portion of the emitted radiation returns to the receiver in the case of natural or non-cooperative targets, usually the signal information from a plurality of pulses is used cumulatively (in particular in-phase) for the evaluation. In the process, the signal-to-noise ratio (SNR) is improved in order thereby also to enable measurements in adverse conditions. By using a plurality of measurement light pulses on the same target point, disturbance signals are removed by averaging and the target signal is amplified, corresponding to a theoretical SNR improvement of approximately the square root of the number of accumulated pulses.

In a typical use scenario, the user targets a desired target using the observation device and then triggers the distance measuring process, for example by actuating a trigger button or the like. Thereupon, the measurement result, or further in-depth information derived therefrom, such as coordinates, etc., is displayed to said user, preferably directly by means of the observation channel of the observation device.

The observation device can be equipped with means for determining geographic coordinates, such as a GPS, a constellation identifier, a direction measuring unit, a compass unit, tilt sensors or accelerometers, a night vision function, etc.

In the case of a hand-held observation, instabilities and movements of the device as a result of being held in the hand are to be expected in this case, especially in the form of oscillations or oscillation-like movements as a result of trembling, swaying or twitching of the user. This human hand tremor or so-called hand jitter typically has amplitudes in the range of approximately ±1 mrad to ±5 mrad and jitter frequencies in the range of below approximately 15 Hz, which has a clear visible effect, particularly in the case of faraway targets and high magnifications. In the case of distances of the order of kilometers, small changes in angle of the targeting direction already cause lateral "misses" of the observed target corresponding to several meters. Therefore, continuous, exact targeting of a comparatively small and faraway target is often difficult for the user using a hand-held observation device and requires great concentration and body control. Similar variations in the spatial position of the device can also occur when using the device on an unstable base, such as a land vehicle, aircraft or water vehicle.

As a result of the movements of the observation device, the distance measurement with inclusion of a plurality of measurement light pulses is no longer directed on the same target point, but on a multiplicity of different points in the vicinity of the target which, at least in part, may have varying distances. Therefore, in such a case, the application of a combination of information from a plurality of pulses for determining the distance only brings about a slight improvement in the SNR compared to what is promised from the superposition of information from a plurality of pulses in the theory. This deteriorated SNR can lead to either large measurement errors or to "total miss" of the target. Further increase of the measurement duration for emitting further pulses for improving the SNR, firstly, is undesirable and, secondly, only has limited efficiency due to the further target point deviations occurring thereby.

In the prior art, active dampening or prevention of movements by using a rod or tripod for supporting the device are applied for avoiding trembling movements as a result of being held by hand. However, such additional outlay for setting up the device is undesirable, in particular in view of the primary design as hand-held device.

Electronic components required for digital stabilization use up e. g. additional power and reduce the robustness in rough usage surroundings, for example by the restricted operational temperature ranges of LC displays and CCD cameras. Restricted optical dynamic ranges of these elements and the high computational complexity for digital processing of image information are further undesirable side effects of such solutions.

The European patent application EP 16152316.2A discloses a generic hand-held observation device having a stabilized laser range finder.

EP 2 737 278 B1 discloses controlling a stationary geodetic appliance by means of an eye image acquisition device, but remains silent about guiding a laser beam to a target or stabilizing hand-held devices.

It is an object of the present invention to provide an improved observation device with an optoelectronic rangefinder for measuring the distance to a targeted object, in particular of a hand-held observation device.

A further object is to improve the attainable accuracy of the distance measurement, if the device is held in the hand.

It is a particular object to enable the laser to hit a small distant target with very high probability each time it is triggered, thus extending the distance range in which a reliable distance measurement is possible.

It is another object of the invention to reduce the effect of hand-jitter with increased precision and speed.

It is another object of the invention to provide such an observation device with a more intuitive control of the device by the user.

A further object is to provide additional flexibility for the user, like improved laser-range-finder control via the user's eye pupil and/or for upgrading generic observation devices with minimal technical outlay.

SUMMARY OF THE INVENTION

According to the invention, a distance measurement of a hand-held observation device is at least partially controlled by the eye of a user of the device, in particular also stabilizing the device during the measurement, thus compensating for hand-jitter.

The invention generally relates to a hand-held observation device, comprising at least a first optical observation channel for observations defining a first observation optical axis by receiving and imaging optical light rays onto an image plane, the light rays particularly being within the visible wavelength range for optical observations by the eye of an observer, a laser range finding unit for determining the distance along an axis of the laser range finder between the observation device and a target, the laser range finding unit comprising a laser transmission channel and a laser receiver channel. The laser transmission and receiver channels may be overlapping at an adequate distance thus defining the LRF axis. The laser transmission and the laser receiver channels may be substantially coaxial (i.e. parallel next to each other or truly coaxial), that means coaxial at least if regarded from a considerable distance), and the laser transmission channel and/or the laser receiver channel may be coupled into the first observation channel.

One of the observation channels, typically not the one containing the crosshair, incorporates an image sensor with associated optics (sensor optics) whereas the signal from the image-sensor is real-time processed with an image processing algorithm. Furthermore, an IR light source is located in the said observation channel, which—in active mode—illuminates the operator's eye.

The sensor optics, in combination with the eyepiece optics, images the IR-illuminated eye pupil of the operator on the said image-sensor in such a way that—depending on specific IR illumination concept—the eye pupil is either bright or dark.

In addition to the image of the eye pupil, the IR illumination may also produce a bright point (glint) on the sensor, which is practically independent of the eye movement and as such used as a reference point for the image processing algorithm. Consequently, the movement of the user's eye pupil as given by the image of the pupil centre versus the image of the stable glint is recorded and processed in real time, giving information about hand-jitter during range measurement or object tracking. Said information is used in real-time for the following:

1) The laser transmission channel and/or the laser receiver channel are deflected via two one-directional or a single two-directional (MEMS) mirrors for each channel with the purpose of adjusting deflection angle of the MEMS mirrors such as to aim both transmitter and receiver optical axes synchronously on the target without moving the device and independent of the operator's hand-jitter.

2) The laser transmission channel and/or the laser receiver channel are synchronously deflected via two one-directional or a single two-directional (MEMS) mirrors for each channel with the purpose of continuously adjusting deflection angle of the MEMS mirrors such as to keep both transmitter and receiver optical axes stable on the target and thus minimizing the effect of the operator's hand-jitter.

A stabilized laser measurement starts, for example, by pushing a trigger button or via the user's pupil interaction, which activates the laser range finder for a single measurement or tracking for continuously measuring the observed target. The end of the measurement window can be defined by a second push of the same or another button or via user's pupil interaction, by a predetermined temporal measurement duration, and/or, in terms of a single laser range measurement, by reaching a predetermined minimum number of pulses to be accumulated or by reaching a minimum number of pulses at which a sufficient SNR threshold of the accumulated information is reached.

Therefore, the laser aiming, defined by the LRF axes, with respect to the observation optical axis are almost perfectly stabilized, enabling the laser to hit a small distant target with very high probability each time it is triggered and thus in extending the distance range in which a reliable distance measurement is possible.

Furthermore, the solution according to the invention ensures minimal technical outlay, since both the receiver and transmitter channel can be stabilized by movements of the same optical MEMS component(s) equally and in one go, and thus the solution provides an increased measurement and line of sight precision for faster measurement or tracking of a moving target with minimal size and weight of the mechanism. It also keeps the observation device robust and compact for use in the field and operable in a quick and simple manner.

The observation device may be laid out as a binocular optical system with a first and a second binocular channel.

In a specific binocular embodiment the first binocular channel, comprising the first observation channel and the laser transmission channel, may be used for transmission of the laser light towards the target, and the second binocular channel, comprising a second observation channel and the laser receiver channel, may be used for receiving the laser light reflected at the target, the first and second observation channels respectively comprising the first and a second opto-mechanical MEMS stabilization unit. For ensuring a most compact setup, the laser transmission channel may be coupled into the first observation channel and the laser receiver channel may be coupled into the second observation channel, e. g. by beamsplitters.

Regarding optimized redundancy in the field or a potential use of different laser sources at different occasions, e. g. a visible and an infrared laser source invisible to the human eye, another embodiment of a binocular observation device describes a binocular with the first and the second binocular channel comprising a first and a second laser range finding unit, wherein for each laser range finding unit the respective laser transmission and laser receiver channels are parallel (or—if considered from a distance off—almost coaxial) and form a first and a second MEMS stabilized laser range finding channel, and the first and second laser range finding channels are respectively coupled into the first and second observation channels.

One binocular channel may be kept as an independent observation channel so that the first binocular channel may be solely used as an observing channel, and the stabilized MEMS laser range finding unit, comprising the laser transmission channel and the laser receiving channel, with both the laser transmission and receiving channels being coupled into the second observation channel.

The observation device may comprise an optically transmitting light channel, i.e. being a conventional optical device in terms of the basic function thereof, in which optical radiation is directed directly from the observed target object into the eye of the observer. However, the first observation channel, and if applicable the second observation channel respectively, may comprise a first and a second opto-electronic display means, respectively, for real-time processing and digitally displaying the image plane of the first and second observation channel, respectively, providing additional displaying functionalities, in particular for displaying range information and/or colour rendering for enhancing contrast and/or for displaying image information detected outside of the visual wavelength range.

The first observation channel may comprise a first visual observation channel, in particular comprising the first opto-electronic display means, for real-time observing of the image plane of the first observation channel by eye, and an additional first electronic imaging channel comprising electronic imaging means, particularly CCD sensors and/or CMOS sensors and/or infrared detectors, for digitally storing image information of the image plane of the first observation channel and making said information available for external post-processing.

A first aspect of the invention pertains to a hand-held observation device for observing distant targets, comprising at least a first optical observation channel defining a first observation optical axis by receiving and imaging optical light rays onto an image plane for observations of a user, a first eyepiece being arranged at the first optical observation channel, and a laser range finder for determining, along an axis of the laser range finder, a distance between the observation device and a target, the laser range finder being adapted to emit a laser beam through a laser emission channel and receive a reflection of the laser beam through a laser receiver channel. According to this aspect of the invention, the device comprises at least one light source that is adapted to emit light, particularly infrared light, to illuminate a user's eye at the first eyepiece, an image sensor that is adapted to capture images of the eye, and comprises an electronic image processing unit for determining, in real time, eye parameters that indicate a gazing direction of the user, and at least one opto-mechanical alignment unit that is adapted to deflect the laser beam in the laser emission channel and the beam reflection in the laser receiver channel, the at least one opto-mechanical alignment unit comprising at least one mirror, at least one actuator that is adapted to move the at least one mirror, and alignment circuitry for controlling the at least one actuator to move the at least one mirror depending on the eye parameters to emit the laser beam onto a target in the gazing direction of the user.

In one embodiment of the observation device, the electronic image processing unit is adapted to recognize a relative movement of a pupil based on the images of the eye and to determine in real time a jittering movement of the device based on the relative pupil movement, and the alignment circuitry is adapted to control the at least one actuator to stabilize the axis of the laser range finder in real time by moving the at least one mirror in a way compensating for the determined jittering movement at least during emission of the laser beam. In particular, the laser range finder is adapted to determine the distance between the observation device and the target during a measurement period, and the jittering movement is compensated for during the measurement period.

According to another embodiment, the at least one light source is adapted and positioned in such a way that a pupil of the eye and a corneal reflection of the light emitted by the least one light source are recognizable in the images of the eye, and the electronic image processing unit is adapted to recognize, in real time, the pupil and the corneal reflection in the images of the eye, and to determine a movement of the pupil relative to the corneal reflection, wherein the jittering movement is determinable based on the movement of the pupil relative to the corneal reflection.

According to another embodiment, the device comprises at least two light sources that are adapted to emit light to illuminate the eye, wherein a first light source is adapted and positioned in such a way that the corneal reflection is caused by the light emitted by the first light source, and a second light source is adapted and positioned in such a way that the pupil of the eye is recognizable with high contrast, particularly wherein a pupil reflection is caused by the light emitted by the second light source indicating a position of the pupil. In particular, the first light source may be arranged to emit light parallel to the first observation channel, and the second light source may be integrated into the eyepiece of the device.

According to yet another embodiment, the first light source and the second light source are adapted to illuminate the eye alternately, particularly wherein a first image of the eye is captured while the eye is illuminated by the first light source, and a second image of the eye is captured subsequently while the eye is illuminated by the second light source.

In a further embodiment, the alignment circuitry is adapted for controlling the at least one actuator to move the at least one mirror in such a way that the laser beam and the beam reflection are parallel.

According to yet another embodiment, the at least one opto-mechanical alignment unit comprises a single two-directional mirror or two one-directional mirrors, to effect equal deflections in the laser transmission channel and the laser receiver channel, particularly wherein the at least one actuator comprises a micro-electro-mechanical system.

In one embodiment of the device, the laser transmission channel and/or the laser receiver channel is coupled into the at least first observation channel by means of the at least one opto-mechanical alignment unit, in particular wherein the at least one opto-mechanical alignment unit comprises beam-splitters that are adapted and arranged for the coupling, the beam-splitters for instance comprising semi-reflecting mirrors or prisms.

In another embodiment, the observation device comprises a binocular optical system comprising a second observation channel, wherein the first observation channel comprises the laser receiver channel and a first opto-mechanical alignment unit, and the second observation channel comprises the laser transmission channel and a second opto-mechanical alignment unit.

In another embodiment, the eye parameters comprise a position of a pupil of the eye, wherein the electronic image processing unit is adapted to recognize the pupil in the images of the eye and to deduce the gazing direction from a position of the pupil or a pupil centre in the images. In particular, the image sensor comprises a focusing optics which focuses the images of the eye on the sensor.

According to yet another embodiment, the electronic image processor is adapted to determine a deflection angle of each opto-mechanical alignment unit based on a position of the pupil centre in the images which defines the gazing direction. In particular, determining the deflection angle is further based on a known position of the respective opto-mechanical alignment unit within the system, the wavelength of the laser light, and the focal lengths pertaining to the laser transmission channel and the laser receiver channel.

According to a further embodiment of the device, one or more detectable behaviours of the pupil are predefined and assigned to commands of the device, wherein the electronic image processing unit is adapted to detect a predefined behaviour of the pupil, wherein upon detection of a predefined behaviour the assigned command is triggered, in particular wherein the commands relate to functions of the laser range finder.

A second aspect of the present invention pertains to a method for determining a distance to a target by means of a hand-held observation device comprising a laser distance meter, particularly a device according to any one of the preceding claims, the method comprising emitting a laser beam towards the target, receiving a reflection of the laser beam from the target, and determining the distance to the target by means of the time-of-flight method. According to the invention, images of an eye of a user looking at the target are captured, eye parameters that indicate a gazing direction of the user are determined based on the images in real time, at least one mirror of the device is aligned according to the determined eye parameters, and the distance to the target is determined, wherein the laser beam and the reflection of the laser beam are deflected by the aligned at least one mirror.

According to one embodiment of the method, a relative movement of a pupil is determined based on the images of the eye, a jittering movement of the device is determined based on the relative movement of the pupil, and the at least one mirror is stabilized in real-time, in a way compensating for the determined jittering movement while a distance is being determined.

According to another embodiment of the method, one or more detectable behaviours of the pupil are predefined and assigned to commands of the device, particularly to commands of the laser distance meter related to determining a distance to the target, a predefined behaviour of the pupil is detected in the images of the eye, and upon detection of the predefined behaviour the assigned command is triggered.

BRIEF DESCRIPTION OF THE DRAWINGS

In the following, the observation device according to the invention is described in more detail in a purely exemplary manner on the basis of specific embodiments schematically depicted in the drawings, with further advantages of the invention also being discussed. In detail.

DETAILED DESCRIPTION

Figure 1:
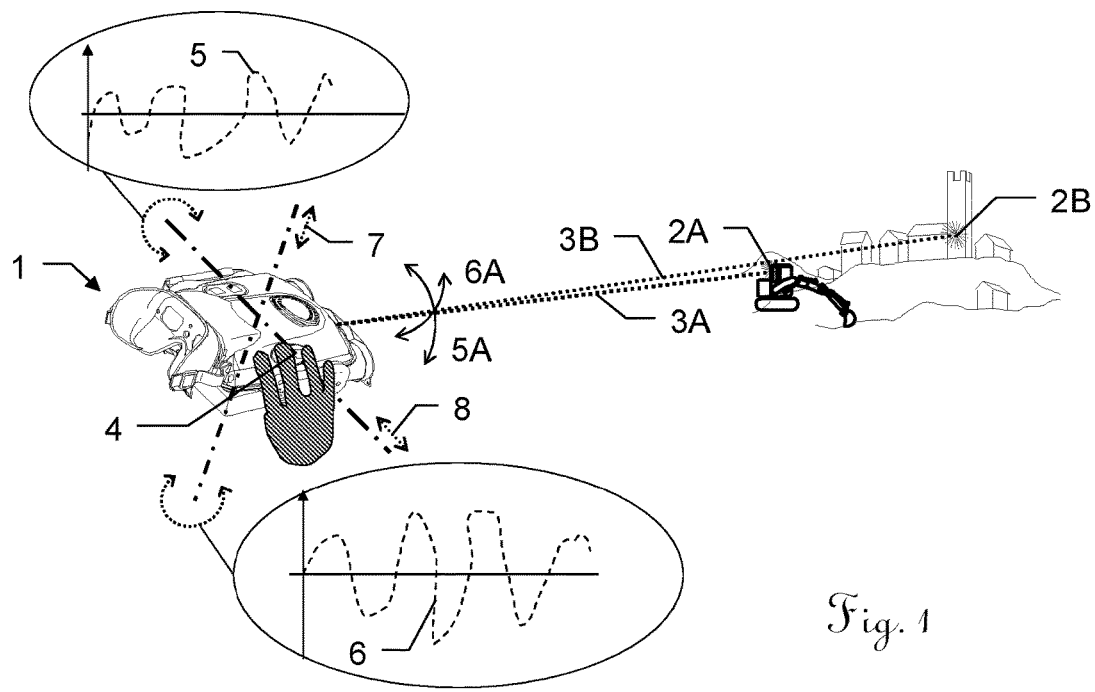
FIG. 1 shows an exemplary illustration of a case of application for a generic hand-held observation device without having a stabilizing unit according to the invention.

FIG. 1 shows an exemplary case for a use of a generic hand-held observation device 1 without stabilizing unit, comprising a laser rangefinder (LRF) which is used for targeting a target object 2A and for determining the distance to the target object 2A along the LRF axis 3A. Here, the observation device 1 has an observation direction which corresponds to the measurement direction of the distance measurement such that the rangefinder can be used to determine a distance to a target point 2B sighted during the observation.

Here, the shown observation device 1 should be used to determine the distance to the vehicle 2A as target object by emitting light pulses and determining the travel time thereof. To this end, the user holds the observation device and uses the generally magnifying transmitted light channel thereof to target the target object 2A and actuates the trigger 4 in order to trigger a distance measurement. This opens a time window for the measurement. During the time window, signal information from a plurality of pulse components cast back by the target object 2A are accumulated in order to determine the distance thereof. By way of example, the end of the time window can be defined by reaching a predetermined minimum number of pulses to be accumulated or by reaching a minimum number of pulses at which a sufficient SNR threshold of the accumulated information is obtained or on the basis of predetermined temporal measurement duration. The determined distance information is thereupon provided to the user or a data processing unit for further processing. Here, in addition to specifying the determined distance in a display, there can also be a graphical or numerical specification of the spatial position accuracy assigned to the distance measurement, for example also together with an accuracy estimate for the distance. By way of example, this can be brought about numerically or graphically.

The restricted stability of holding the device 1 in the case of hand-held observation devices with distance measuring functionality restricts the distance measurement accuracy range considered to be expedient. There is little use for a distance measurement with millimeter accuracy using a hand-held observation device, in particular in the case of measurement distances in the range of several hundred meters or a few kilometers. A magnified observation and measurement of faraway targets is a common object which is to be achieved by such hand-held devices. In the fields of application of the generic observation devices 1, a large measurement range, which enables observation and measurement from a comparatively large distance from a danger zone, is to be preferred over a highly precise measurement. Examples for this can be e. g. hunting, military or police operations, landmark navigation by pedestrians, land vehicles, aircraft or water vehicles, etc.

However, the correct targeting of the target object 2A and the reliable measurement thereof is of importance. As a result of the hand-jitter instability 5, 6, 7, 8 due to holding the device, the targeting does not always point on the target object 2A during the time window. Particularly in the case of relatively large target distances, angle deviations 5, 6 of the order of only a few arc minutes when holding the device, by all means cause a deviation of the order of meters of the targeted point on the target. By way of example, in the shown figure, this means that the measurement direction does not point the LRF axis 3A in the direction of the desired target object 2A, but rather e. g. in the direction of the undesired target 2B. However, components cast back by the undesired target 2B do not contribute to measuring the target object 2A, but rather falsify the measurement, make it ambiguous or increase the uncertainty, reduce the SNR or make determining a distance by the evaluation unit completely impossible. It may even be the case that the observation device outputs to the user the distance to the object 2B even though the user tried to target the object 2A in good faith and accordingly assumes to be measuring this distance. Particularly if such an error can be traced back to a chance inexpedient correlation of the pulse emission with the instability, such an error may not be apparent to the user in any way.

Figure 2:
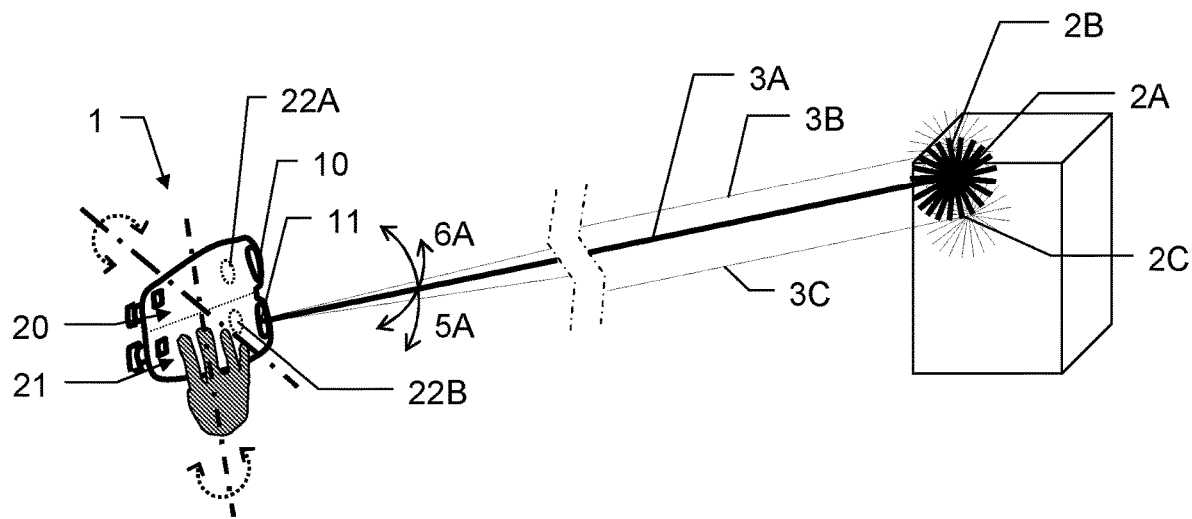
FIG. 2 shows an exemplary illustration of a case of application for an observation device according to the invention.

FIG. 2 shows an exemplary illustration for measuring a target object 2A using an observation device 1 according to the invention in the form of binoculars, which the user holds in the hand in order, by looking into the eyepieces, to target the target object 2A for determining the distance along the LRF axis 3A. In the illustration, the optical radiation is emitted and received through one of the objectives 11; thus, this is a coaxial measurement in which the laser transmission and receiver channels 31, 30 (see FIG. 3a) are coupled into the second observing channel 21. The objective 11 of the second observation channel 21 thus constitutes part of the laser transmission channel 31 (see FIG. 3a) and/or receiver channel 30 (see FIG. 3a) of the rangefinder.

The tremor of the hand which is inevitably present causes angular movements 5A, 6A in the process, which let the LRF axis 3A pointed to point 2A sway in any another direction. Thus, different points 2B, 2C would be measured on the target object, or the determined distance value would be determined as a type of averaging of the travel time information to the different target points 2A, 2B, 2C. When accumulating the signal information, the different targeting could cause e. g. a broadening of the reflection pulse shape in the signal used for determining the distance, which, instead of the lower SNR of the sought-after ideal case of the multi-pulse measurement, can cause a larger width of the measurement uncertainty range and, possibly, also ambiguities in the determined distance. This is the case, even though the user actuates the trigger 4 when, in the view of said user, there is exact targeting of the desired target point 2A.

According to one aspect of the present invention, both observation channels 20, 21 of the binocular device comprise a first and a second opto-mechanical stabilization unit 22A, 22B, respectively, for actively stabilizing the LRF line-of-sight axis 3A during an observation against hand-jittering. The opto-mechanical stabilization units 22A, 22B are adapted for continuously adjusting and setting a lateral position in vertical and horizontal direction respectively, of the respective LRF transmitter and receiver channel, in a way automatically controlled by an electronic image processing and MEMS control unit, which processes the operator's pupil position data of the observation device 1, particularly in a way wherein the adjusting of the lateral position (i.e. perpendicular to the respective observation optical axis) of both LRF channels, equally stabilizes the line of sight axis in one go, here the LRF axis 3A.

The electronic processing and control unit (not shown) controls small MEMS mirrors in the stabilization mechanism. The line-of-sight axes 3A, 3B are being moved according to a special formula, which is based on the position of the centre of the operator's eye pupil, to assure that laser and receiver axis will be moving parallel and synchronously to each other. A stabilized laser range measurement starts when activating a trigger button 4 or via the user's pupil interaction which opens a time window for the stabilized ranging. The end of the time window can be defined by a second activation of the same interaction or another button, by a predetermined temporal measurement duration, and/or, in case of a single laser range measurement, by reaching a predetermined minimum number of pulses to be accumulated or by reaching a minimum number of pulses at which a sufficient SNR threshold of the accumulated information is reached.

Therefore, both LRF axes 3A, 3B are stabilized, enabling the laser to hit a small distant target with very high probability each time it is triggered and thus in extending the distance range in which a reliable distance measurement is possible.

Figure 3A:
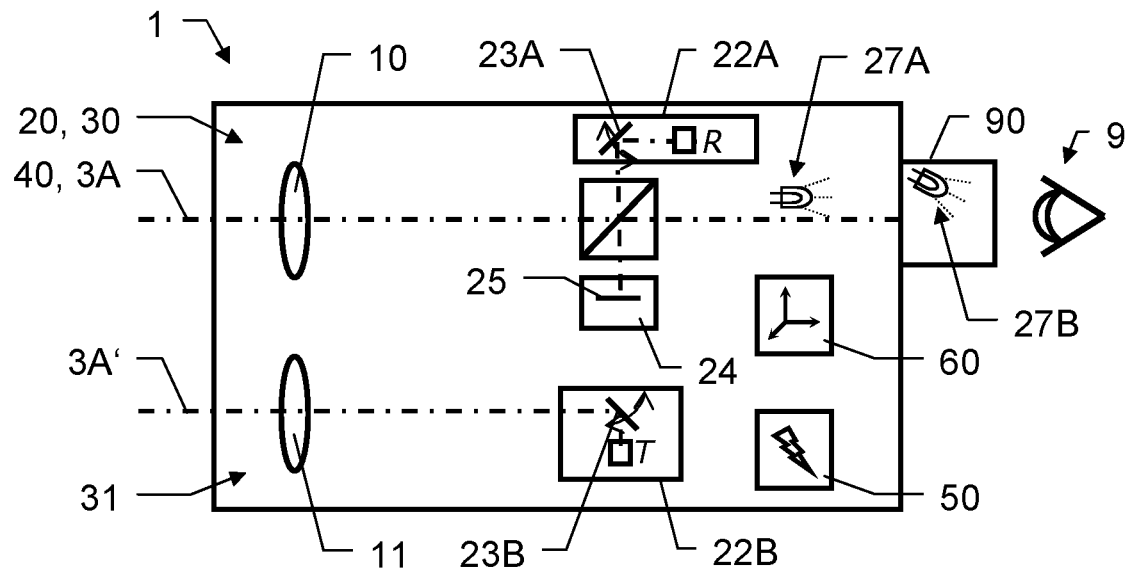
FIGS. 3a,b indicate exemplary optical assemblies of the observation device for a monocular setup.
Figure 3B:
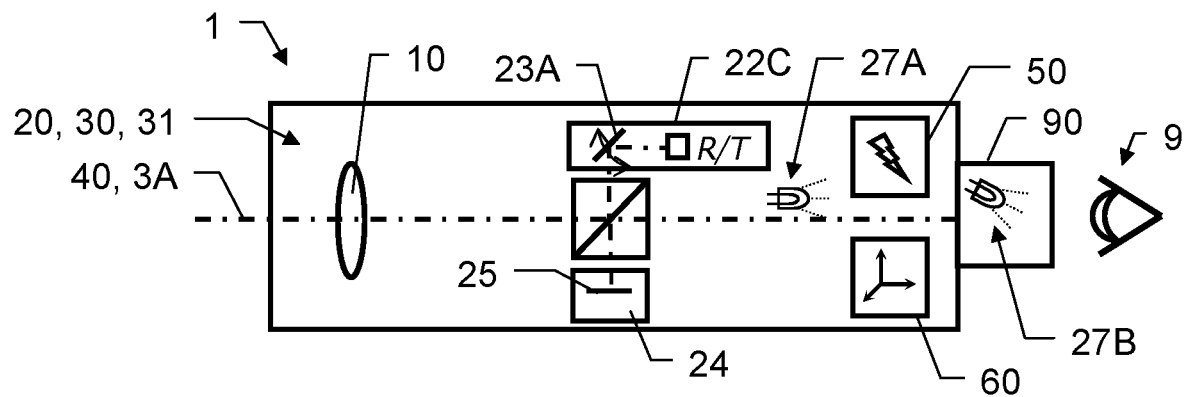

FIGS. 3a and 3b illustrate exemplary optical assemblies of the observation device 1 for two different monocular setups according to the invention, the two embodiments mainly differing by the amount of overlap between the observation channel 20 and the laser transmission and receiver channels 31,30.

FIG. 3a indicates, by way of example, optical assemblies of the observation device 1 for a first monocular setup according to the invention. It shows an embodiment where the laser transmission channel 31, comprising the laser transmitter T with its MEMS steering unit 22B, is separate from the first observation channel 20, whereas the laser receiver channel 30, comprising the laser receiver R and its MEMS steering unit 22A, is coupled into the first observing channel 20, both the observation light and the laser light entering through a common objective 10. Both the receiver channel 20 and the laser transmission channel 31, respectively, comprise an opto-mechanical stabilization unit 22A, 22B, equally stabilizing the line-of-sight axis 3A, 3A' of the LRF (i.e. the axes of the transmitter and the receiver of the LRF).

Also indicated are two infrared light source units 27A, 27B for illuminating an eye 9 of a user at an eyepiece 90 of the device 1. An image sensor 25 is provided for capturing images of the eye 9. The image sensor comprises a processing and control unit 24 which reads and processes the operator's pupil center data in real time, based on which the opto-mechanical stabilization units 22A, 22B are controlled to equally stabilize the line of sight by adjusting the lateral position in vertical and horizontal direction in one go.

The first and second light source units 27A, 27B optionally can comprise a common light source, wherein the light is guided to the light source units 27A, 27B e. g. by means of optical fibres, to emit the light from the position of the light source units 27A, 27B to the eye 9.

FIG. 3b shows a more compact set-up of the observation device 1 with only one opto-mechanical stabilization unit 22C shared by laser transmitter T and receiver R.

Figure 4A:
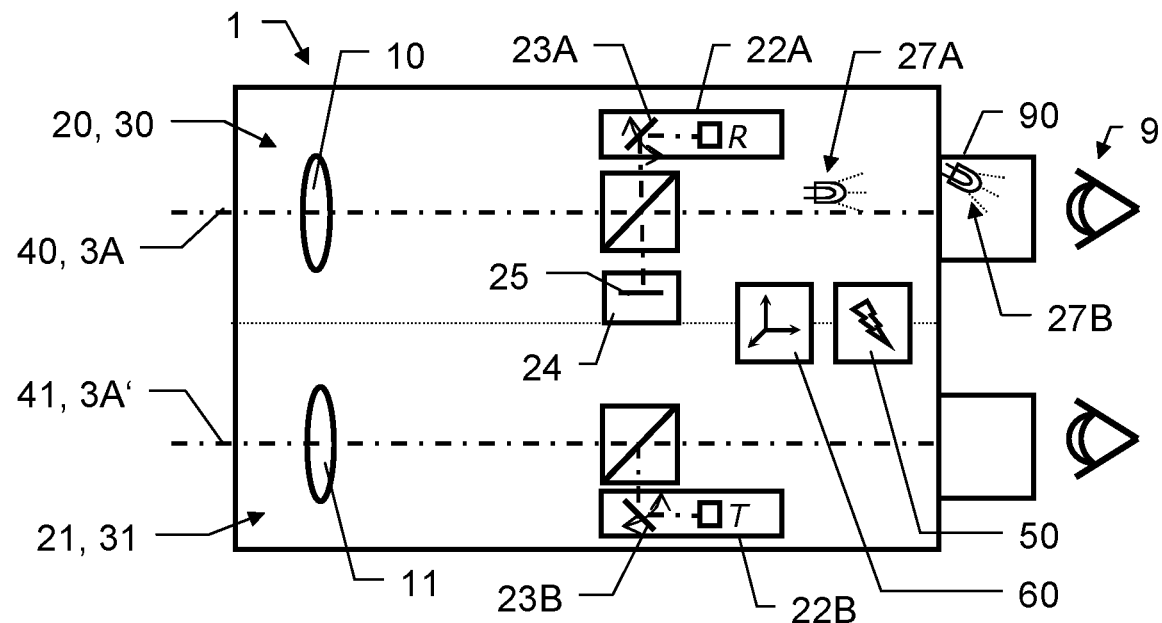
FIGS. 4a,b indicate exemplary optical assemblies of the observation device for a binocular setup.
Figure 4B:
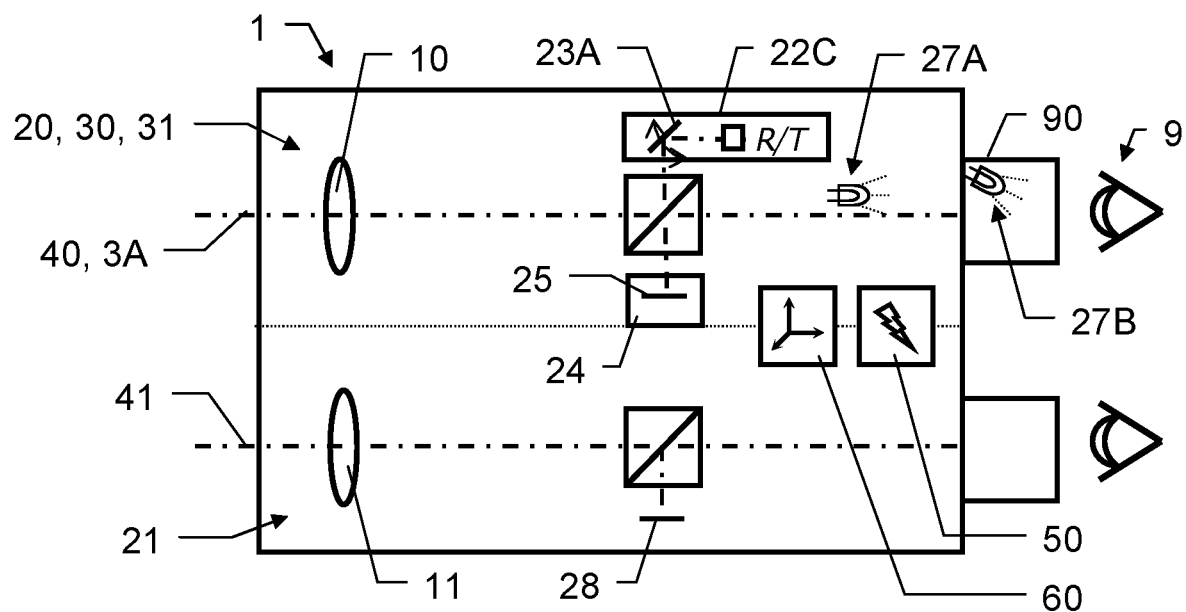

Similarly, FIGS. 4a and 4b indicate exemplary embodiments of the observation device 1 for different binocular setups according to the invention, again with the two embodiments mainly differing by the amount of overlap between the two observation channels 20, 21 and the laser transmission and receiver channels 31, 30.

FIG. 4a shows an exemplary embodiment where the first binocular channel 20 is equally used as a first observation channel 20 and as the laser receiver channel 30, comprising the laser receiver R and its MEMS steering unit 22A, whereas the second binocular channel is equally used as a second observation channel 21 and as the laser transmission channel 31, comprising the laser transmitter T and its MEMS steering unit 22B. The observation channels 20, 21 comprise a first and a second opto-mechanical stabilization unit 22A, 22B, which are respectively used, on the one hand, for equally stabilizing the LRF line-of-sight axis 3A' (particularly here the laser transmitter), and, on the other hand, for equally stabilizing the LRF axis 3A (particularly here the laser receiver axis). The stabilization can be done by adjusting of the lateral position of the MEMS mirrors in vertical and horizontal direction wherein the laser optical axis are stabilized in one go by the same MEMS mirror adjustment.

Also indicated are two infrared light source units 27A, 27B for illuminating an eye 9 of a user at an eyepiece 90 of the device 1. An image sensor 25 is provided for capturing images of the eye 9. The image sensor comprises a processing and control unit 24 for reading and processing the operator's pupil center data, based on which the opto-mechanical stabilization units 22A, 22B are controlled to equally and synchronously stabilize the line of sight of the LRF, i.e. to equally stabilize the LRF axes 3A, 3A'.

FIG. 4b shows another exemplary embodiment where the first binocular channel is solely used as a first observation channel 21, whereas the second binocular channel is equally used as a second observation channel 20 and as the laser transmission and receiver channel 31, 30, the laser source T and the receiver R being combined using special beamsplitters (or several beamsplitters). Again, there is only one opto-mechanical stabilization unit 22C shared by laser transmitter T and receiver R.

Figure 5A:
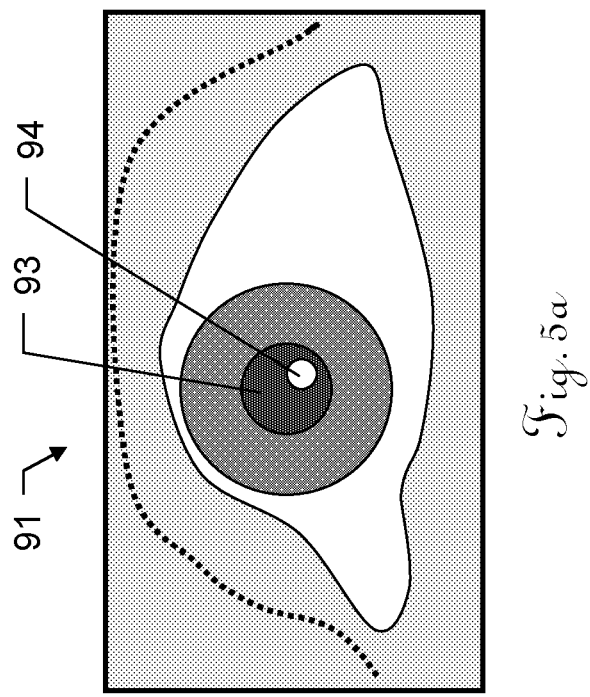
FIGS. 5a,b show two examples for images of an eye that are generated by two differently positioned light sources.
Figure 5B:
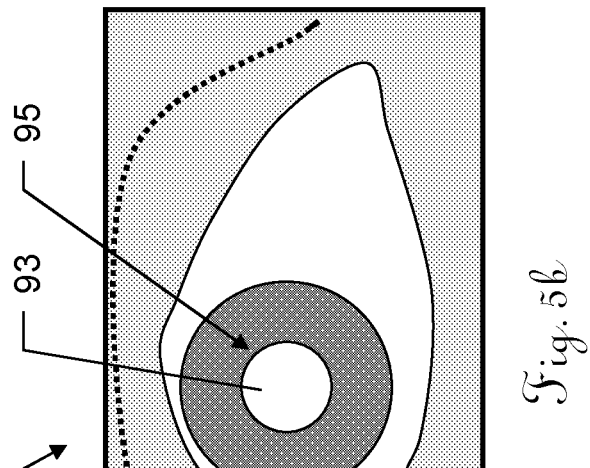

FIGS. 5a and 5b show images 91, 92 of the user's eye that are used for controlling the laser range finder.

FIG. 5a shows a first image 91 of the eye as captured by the image sensor 25 when the user's eye is illuminated by a first light source 27A (see FIGS. 3a,b, 4a,b). The pupil 93 is visible in this image 91 as a black circle, and a pupil centre is determinable from said image. The first light source 27A is arranged to emit infrared light parallel to the eye's observation channel, i.e. illuminating the eye frontally. This illumination results in a reflection of the light emitted by the first light source on the eye's cornea (corneal reflection 94). The corneal reflection 94 is visible in the first image 91 as a glint in the eye's black pupil 93.

The corneal reflection 94 received by the image sensor is practically independent of any movements of the eye and as such can be used as a reference point for the image processing algorithm of the sensor's processing and control unit. Consequently, any movement of the user's eye pupil 93 as given by the image of the pupil centre versus the image of the stable glint 94 is recorded and processed in real time, giving information about hand-jitter during range measurement or object tracking. Using this information, the laser transmission channel and the laser receiver channel can be adjusted such as to keep both transmitter and receiver optical axes stable on the target, minimizing the effect of the operator's hand-jitter.

Additionally or alternatively to using the glint 94 as a reference point for determining the relative movement of the user's eye pupil 93, also other means can be used. For instance, the device may comprise a gyro which delivers data that can be compared in real time with movements of the user's eye pupil 93.

FIG. 5b shows a second image 92 of the eye as captured by the image sensor 25 when the user's eye is illuminated by a second light source 27B (see FIGS. 3a,b and 4a,b). The light source 27B is arranged in the eyepiece to illuminate the eye angled to the eye's observation channel. This angled illumination of the eye results in a reflection of the pupil 93 which consequently appears as a white circle 95, providing for a higher contrast of the pupil 93 in the second image 92 than in the first image 91, thus facilitating the determination of the pupil centre.

The first and second light sources can be used together to provide the glint 94 of the first image 91 and the high contrast of the second image 92. For instance, the first and second images 91, 92 can be generated sequentially by turning on and off the second light source (e. g. alternating with the first light source), so that the corneal reflection 94 and the white pupil 95 may be provided alternating in every second image captured by the image sensor.

The pupil centre information which indicates a gazing direction of the user can be used in real-time to control the laser range finder of the device: The laser transmission channel and the laser receiver channel can be adjusted according to the user's gazing direction such as to aim both transmitter and receiver optical axes synchronously on the target (i.e. an object in the user's gazing direction) without moving the device.

Furthermore, the pupil centre detection can be used for triggering the laser range finder or other device commands using a predefined behaviour of the user's pupil 93. For example, a predefined behaviour meaning "trigger the distance measurement" could be that the pupil 93 remains stationary for two seconds. Optionally, commands can be provided to the user visually for selection, and the user can select a command by looking at it for a defined time.

Although the invention is illustrated above, partly with reference to some preferred embodiments, it must be understood that numerous modifications and combinations of different features of the embodiments can be made. All of these modifications lie within the scope of the appended claims.

The invention claimed is:

1. Hand-held observation device for observing distant targets, comprising:
   at least a first optical observation channel defining a first observation optical axis by receiving and imaging optical light rays onto an image plane for observations of a user, a first eyepiece being arranged at the first optical observation channel;
   a laser range finder for determining, along an axis of the laser range finder, a distance between the observation device and a target, the laser range finder being adapted to emit a laser beam through a laser emission channel and receive a reflection of the laser beam through a laser receiver channel;
   at least one light source that is adapted to emit light to illuminate a user's eye at the first eyepiece;
   an image sensor that is adapted to capture images of the eye, and comprises an electronic image processing unit for determining, in real-time, eye parameters that indicate a gazing direction of the user; and
   at least one opto-mechanical alignment unit that is adapted to deflect the laser beam in the laser emission channel and the beam reflection in the laser receiver channel, the at least one opto-mechanical alignment unit comprising at least one mirror, at least one actuator that is adapted to move the at least one mirror, and alignment circuitry for controlling the at least one actuator to move the at least one mirror depending on the eye parameters to emit the laser beam onto a target in the gazing direction of the user.

2. Hand-held observation device according to claim 1, wherein:
   the electronic image processing unit is adapted to recognize a relative movement of a pupil based on the images of the eye and to determine in real time a jittering movement of the device based on the relative pupil movement; and
   the alignment circuitry is adapted to control the at least one actuator to stabilize the axis of the laser range finder in real time by moving the at least one mirror in a way compensating for the determined jittering movement at least during emission of the laser beam.

3. Hand-held observation device according to claim 2, wherein:
   the at least one light source is adapted and positioned in such a way that a pupil of the eye and a corneal reflection of the light emitted by the least one light source are recognizable in the images of the eye; and
   the electronic image processing unit is adapted to recognize, in real time, the pupil and the corneal reflection in the images of the eye, and to determine a movement of the pupil relative to the corneal reflection;
   the jittering movement is determinable based on the movement of the pupil relative to the corneal reflection.

4. Hand-held observation device according to claim 3, further comprising:
   at least two light sources that are adapted to emit light to illuminate the eye, wherein:
   a first light source is adapted and positioned in such a way that the corneal reflection is caused by the light emitted by the first light source, and
   a second light source is adapted and positioned in such a way that the pupil of the eye is recognizable with high contrast, wherein a pupil reflection is caused by the light emitted by the second light source indicating a position of the pupil.

5. Hand-held observation device according to claim 4, wherein:
   the first light source and the second light source are adapted to illuminate the eye alternately.

6. Hand-held observation device according to claim 5, wherein a first image of the eye is captured while the eye is illuminated by the first light source, and a second image of the eye is captured subsequently while the eye is illuminated by the second light source.

7. Hand-held observation device according to claim 4, wherein:
   the first light source is arranged to emit light parallel to the first observation channel, and/or
   the second light source is integrated into the eyepiece of the device.

8. Hand-held observation device according to claim 2, wherein the laser range finder is adapted to determine the distance between the observation device and the target during a measurement period, and the jittering movement is compensated for during the measurement period.

9. Hand-held observation device according to claim 1, wherein:
   the alignment circuitry is adapted for controlling the at least one actuator to move the at least one mirror in such a way that the laser beam and the beam reflection are parallel.

10. Hand-held observation device according to claim 1, wherein
    the at least one opto-mechanical alignment unit comprises:
    a single two-direction of rotation mirror, or
    two one-direction of rotation mirrors, to effect equal deflections in the laser transmission channel and the laser receiver channel.

11. Hand-held observation device according to claim 10, wherein the at least one actuator comprises a micro-electromechanical system.

12. Hand-held observation device according to claim 1, wherein
the laser transmission channel and/or the laser receiver channel is coupled into the at least first observation channel by means of the at least one opto-mechanical alignment unit.

13. Hand-held observation device according to claim 12, wherein the at least one opto-mechanical alignment unit comprises beam-splitters that are adapted and arranged for the coupling, the beam-splitters comprising semi-reflecting mirrors or prisms.

14. Hand-held observation device according to claim 1, wherein
the observation device comprises a binocular optical system comprising a second observation channel, wherein the first observation channel comprises the laser receiver channel and a first opto-mechanical alignment unit, and the second observation channel comprises the laser transmission channel and a second opto-mechanical alignment unit.

15. Hand-held observation device according to claim 1, wherein
the eye parameters comprise a position of a pupil of the eye, wherein the electronic image processing unit is adapted to recognize the pupil in the images of the eye and to deduce the gazing direction from a position of the pupil or a pupil centre in the images, wherein the image sensor (25) comprises a focusing optics which focuses the images (91, 92) of the eye (9) on the sensor (25).

16. Hand-held observation device according to claim 15, wherein
the electronic image processor is adapted to
determine a deflection angle of each opto-mechanical alignment unit based on a position of the pupil centre in the images which defines the gazing direction.

17. Hand-held observation device according to claim 16, wherein determining the deflection angle is further based on a known position of the respective opto-mechanical alignment unit within the system, the wavelength of the laser light, and the focal lengths pertaining to the laser transmission channel and the laser receiver channel.

18. Hand-held observation device according to claim 15, wherein
one or more detectable behaviours of the pupil are predefined and assigned to commands of the device, wherein the electronic image processing unit is adapted to detect a predefined behaviour of the pupil, wherein upon detection of a predefined behaviour the assigned command is triggered, wherein the commands relate to functions of the laser range finder.

19. Hand-held observation device according to claim 15, wherein the image sensor comprises a focusing optics which focuses the images of the eye on the sensor.

20. Hand-held observation device according to claim 1, wherein the at least one light source is adapted to emit infrared light to illuminate the user's eye at the first eyepiece.

21. Method for determining a distance to a target by means of a hand-held observation device according to claim 1, the method comprising: emitting a laser beam towards the target, receiving a reflection of the laser beam from the target, and determining the distance to the target by means of the time-of-flight method, wherein:
images of an eye of a user are captured, the user looking at the target,
eye parameters that indicate a gazing direction of the user are determined based on the images in real time,
at least one mirror of the device is aligned according to the determined eye parameters, and
the distance to the target is determined, wherein the laser beam and the reflection of the laser beam are deflected by the aligned at least one mirror.

22. Method for determining a distance to a target by means of a hand-held observation device comprising a laser distance meter, the method comprising: emitting a laser beam towards the target, receiving a reflection of the laser beam from the target, and determining the distance to the target by means of the time-of-flight method, wherein:
images of an eye of a user are captured, the user looking at the target,
eye parameters that indicate a gazing direction of the user are determined based on the images in real time,
at least one mirror of the device is aligned according to the determined eye parameters, and
the distance to the target is determined, wherein the laser beam and the reflection of the laser beam are deflected by the aligned at least one mirror.

23. Method according to claim 22, wherein:
a relative movement of a pupil is determined based on the images of the eye;
a jittering movement of the device is determined based on the relative movement of the pupil; and
the at least one mirror is stabilized in real-time, in a way compensating for the determined jittering movement while a distance is being determined.

24. Method according to claim 22, wherein:
one or more detectable behaviours of the pupil are predefined and assigned to commands of the laser distance meter related to determining a distance to the target;
a predefined behaviour of the pupil is detected in the images of the eye; and
upon detection of the predefined behaviour the assigned command is triggered.

* * * * *